April 3, 1928.
G. L. DANFORTH, JR
1,665,086
OPEN HEARTH FURNACE
Filed July 13, 1922
5 Sheets-Sheet 1
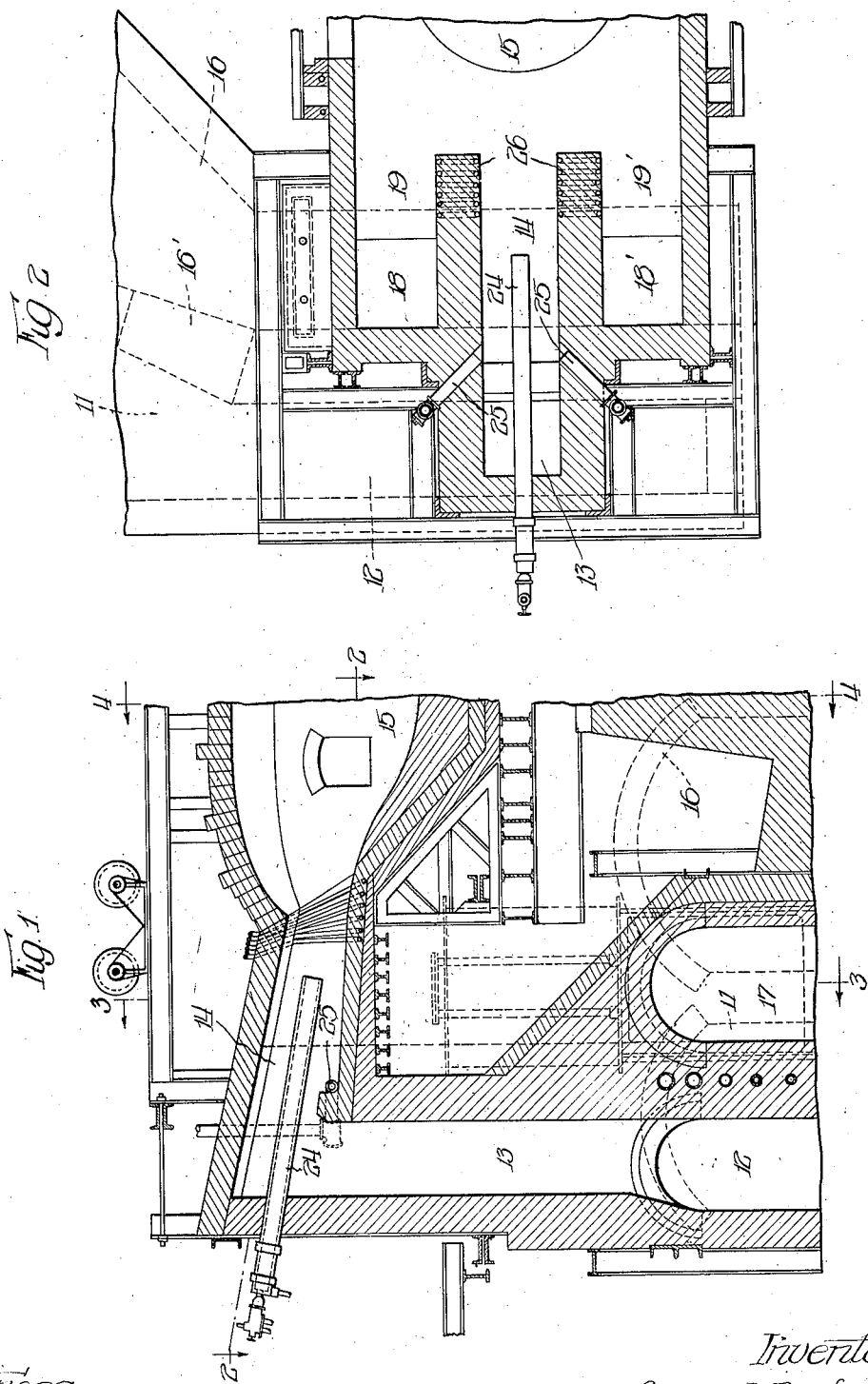
Witness:
R. Burkhardt.
Inventor:
George L. Danforth Jr.
By L. Anthony Usina
Atty

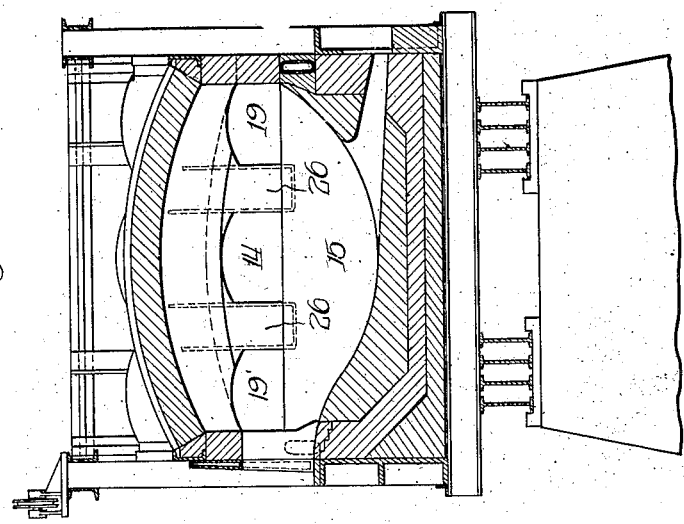
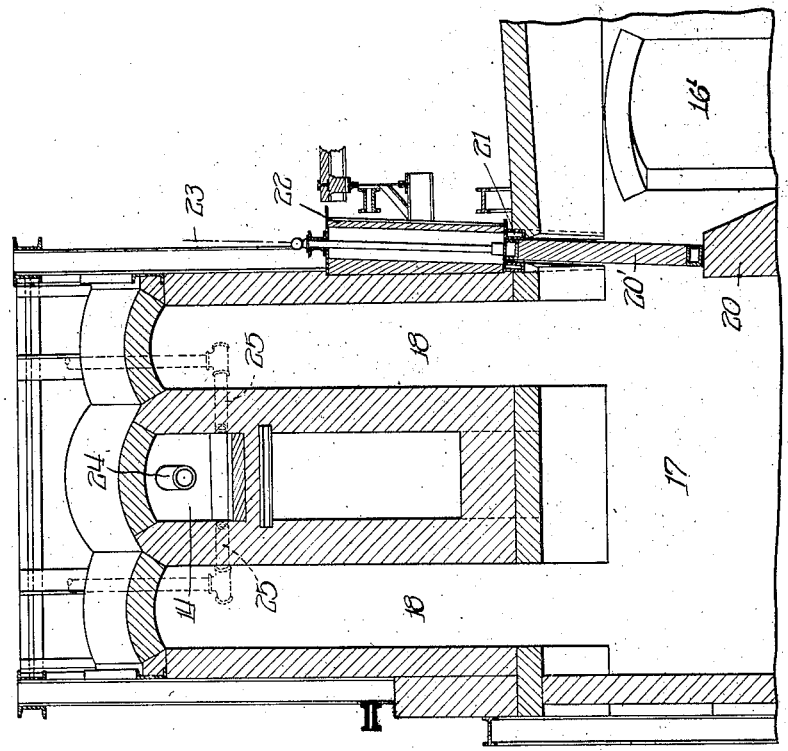

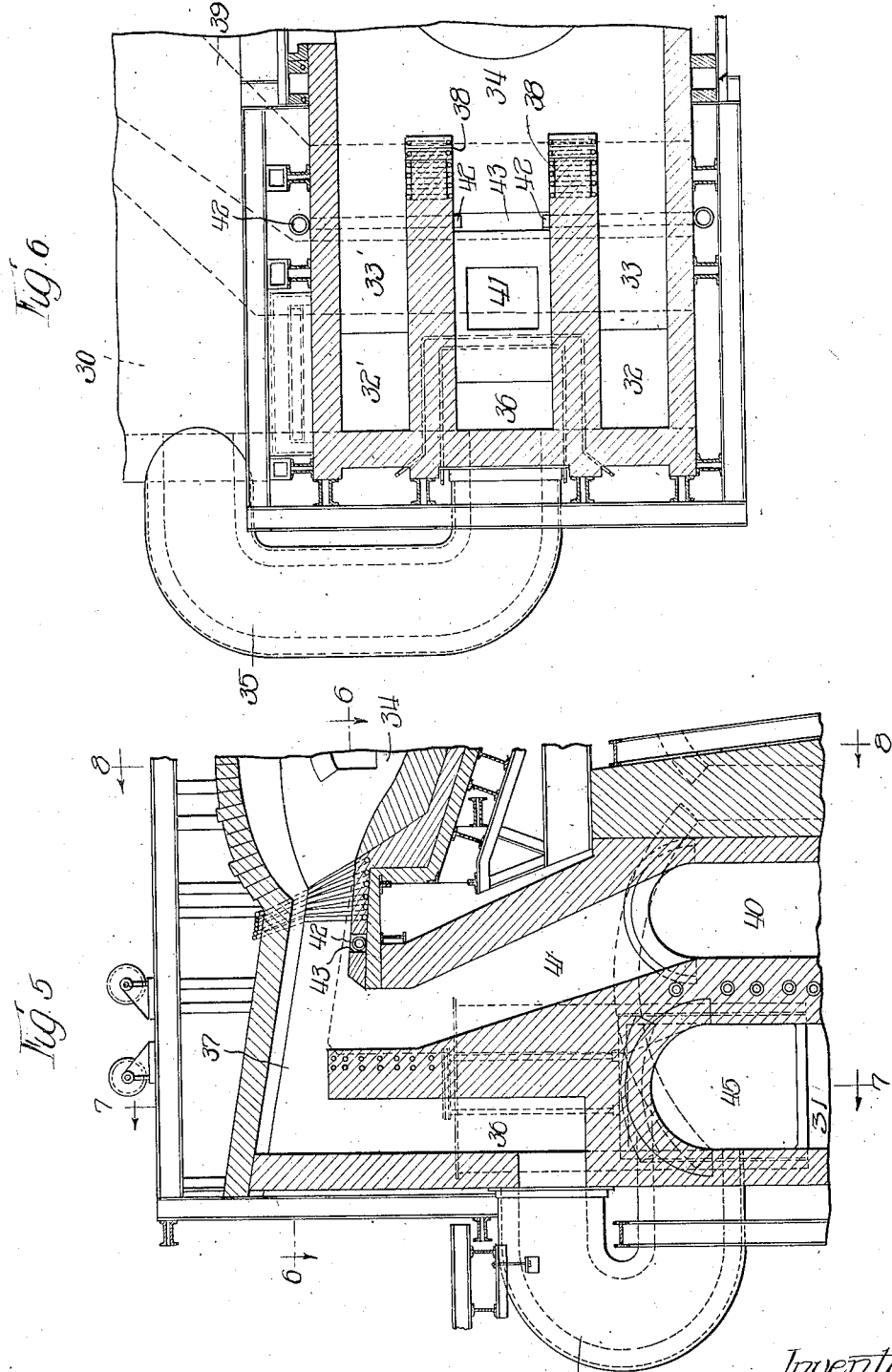

April 3, 1928.
G. L. DANFORTH, JR
1,665,086
OPEN HEARTH FURNACE
Filed July 13, 1922
5 Sheets-Sheet 4
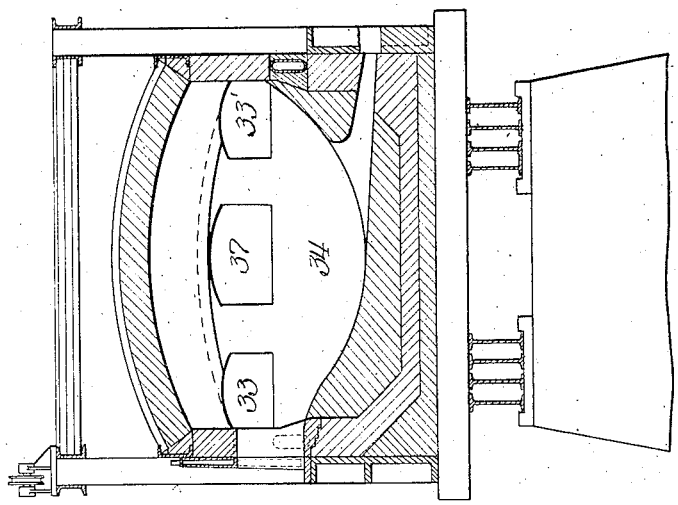
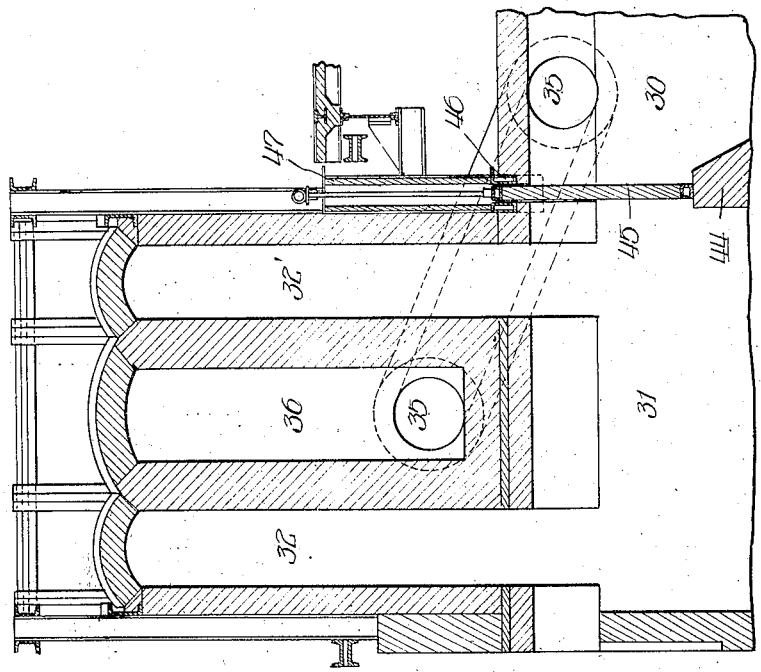
Witness:
R. Burkhardt
Inventor:
George L. Danforth Jr.,
By L. Anthony Ksina
Atty.

April 3, 1928.
G. L. DANFORTH, JR
1,665,086
OPEN HEARTH FURNACE
Filed July 13, 1922
5 Sheets-Sheet 5
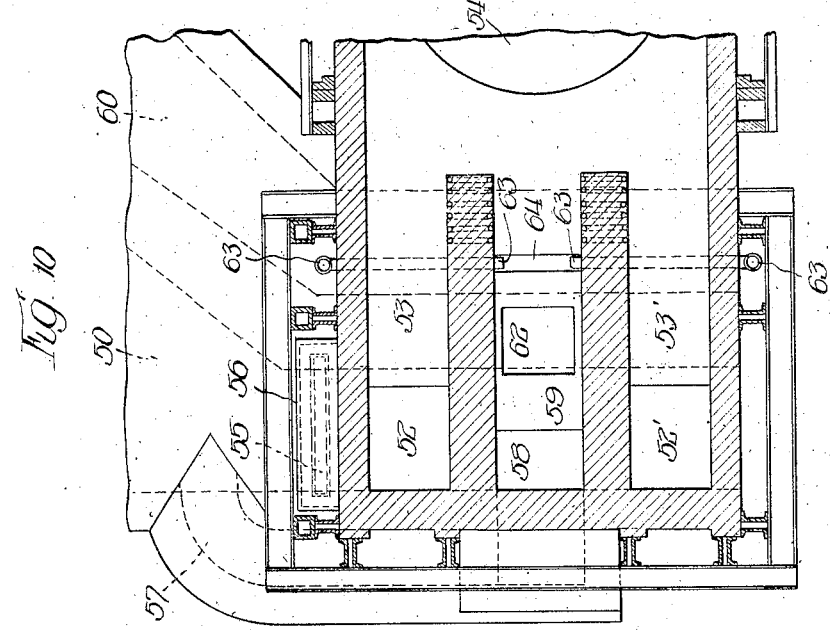
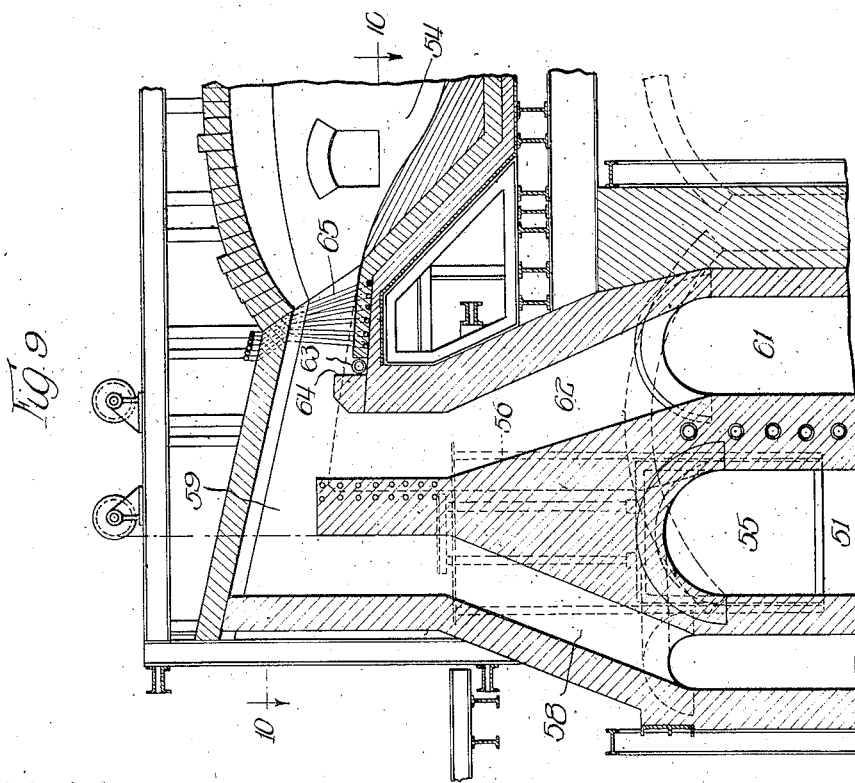
Witness:
G. Burkhardt.
Inventor
George L. Danforth Jr.,
By L. Anthony Llama
Atty.

Patented Apr. 3, 1928.

1,665,036

UNITED STATES PATENT OFFICE.

GEORGE L. DANFORTH, JR., OF CHICAGO, ILLINOIS, ASSIGNOR, BY MESNE ASSIGNMENTS, TO OPEN HEARTH COMBUSTION COMPANY, OF CHICAGO, ILLINOIS, A CORPORATION OF DELAWARE.

OPEN-HEARTH FURNACE.

Application filed July 13, 1922. Serial No. 574,727.

This invention relates to a new and improved open hearth furnace and more particularly to means for controlling the flow from the regenerators to the slag pockets of such furnaces.

As is well known in the art, an open hearth furnace is doubled-ended and is reversed in operation so that each end serves alternately to introduce the fuel and air and to carry off the products of combustion. The volume of the products of combustion greatly exceeds the volume of the incoming air and fuel and the ports therefor must largely be designed with reference to the necessary facilities for carrying off the products of combustion. However, it is essential for efficient furnace operation that the incoming air and fuel be so directed as to properly intermingle and to give a relatively short, hot flame which may be adequately controlled and directed upon the bath of metal in the furnace.

In the effort to reconcile these two somewhat conflicting requirements, certain furnaces have been designed with additional ports which serve on the outgoing end to carry off the products of combustion and which are blocked off upon the incoming end so that the incoming air is concentrated in a relatively small port. A furnace of this type is shown in the patent to McKune No. 1,339,855, issued May 11, 1920.

Furnaces of this type provided with dampers are somewhat complicated due to the addition of the dampers, damper rigging and operating machinery and also due to the cooling effect of the water-cooled dampers and damper guides which are located in the passages relatively close to the furnace chamber. Also these furnaces, as generally designed, require two dampers at each end of the furnace, one located in each of the supplemental ports which serve to carry off the products of combustion.

It is an object of the present invention to provide a furnace construction whereby the flow from the regenerators to the furnace is controlled.

It is a further object to provide means whereby the flow between the regenerators and the supplemental discharge ports of the furnace is controlled and whereby when such flow is interrupted, flow is permitted between the regenerators and the incoming port.

It is also an object to provide means of this character in which the mechanism is located outside of the furnace ports and slag pockets and in which the result is accomplished by a single movable damper at each end of the furnace.

It is an additional object to provide means of this character which may be readily applied to existing installations without material alteration therein.

Other and further objects will appear as the description proceeds.

Broadly, my invention comprises the provision of movable means for cutting off flow between the regenerators and the supplemental discharge ports and it further involves by-pass passages whereby the incoming air may be conducted to the incoming ports when the control means are in the shut position.

I have illustrated certain preferred embodiments of my invention in the accompanying drawings, in which—

Figure 1 is a longitudinal, vertical section of one end of a furnace constructed according to the present invention;

Figure 2 is a horizontal section taken on line 2—2 of Figure 1;

Figure 3 is a vertical transverse section taken on line 3—3 of Figure 1;

Figure 4 is a section taken on line 4—4 of Figure 1;

Figure 5 is a view similar to Figure 1 showing a modified form of construction;

Figure 6 is a horizontal section taken on line 6—6 of Figure 5;

Figure 7 is a transverse vertical section taken on line 7—7 of Figure 5;

Figure 8 is a transverse vertical section taken on line 8—8 of Figure 5;

Figure 9 is a view similar to Figure 1 showing a further modified form; and

Figure 10 is a horizontal transverse section taken on line 10—10 of Figure 9.

Referring first to the form of construction shown in Figures 1 to 4, passage 11 is connected to slag pocket 12 and the uptake 13 leads from slag pocket 12 to the rear end of the incoming port 14 which discharges into the furnace chamber 15. The passage 16 leads from suitable regenerators to the slag pocket 17 and the uptakes 18 and 18' lead from the slag pocket 17 to the supplemental ports 19 and 19' which communicate with the furnace chamber 15.

As shown in Figures 2 and 3, the opening 16' is cut through the wall between passages 11 and 16. The bridge wall 20 is located between passage 16 and slag pocket 17 and the vertical water-cooled damper 20' rests in its lower position upon this bridge wall 20. This damper moves in water-cooled guides 21 and is movable vertically into housing 22 by cable 23 operated by any suitable mechanism (not shown). Fuel is introduced to the port 14 by the central nozzle 24 or by the lateral nozzles 25 or it may be introduced by all three nozzles. As shown, the end of the port 14 is cooled by pipes 26.

Referring now to the form of construction shown in Figures 5 to 8, the passage 30 leads from suitable regenerators to the slag pocket 31 from which lead the supplemental uptakes 32 and 32' discharging into ports 33 and 33', respectively, which latter communicate with the furnace chamber 34. The by-pass passage 35 connects the passage 30 and the uptake 36 which latter leads into the rear end of the main furnace port 37. The discharge opening of this port 37 is water-cooled by pipes 38 as shown in Figures 5 and 6. The passage 39 leads to the slag pocket 40 from which the uptake 41 leads into the port 37 in advance of the entrance of the uptake 36 therein. The pipes 42 discharge into trench 43 extending across the port 37 and may be utilized to introduce fuel such as coke oven or natural gas.

The bridge wall 44 is located between the passage 30 and the slag pocket 31. The vertically movable damper 45 rests in its lower position upon this bridge wall 44 and serves to completely close off communication between the passage and slag pocket. The damper 45 is guided in the water-cooled guides 46 and in its upper position fits in housing 47. The damper is moved vertically by any suitable mechanism (not shown).

Referring now to the form of construction shown in Figures 9 and 10, the passage 50 leads from suitable regenerators to the slag pocket 51. This slag pocket 51 is connected by uptakes 52 and 52' with the supplemental ports 53 and 53' which latter communicate with the furnace chamber 54. The vertically movable damper 55 is guided in water-cooled guides 56 and in its lower position rests upon the bridge wall between passage 50 and slag pocket 51 and serves to completely close off communication therebetween.

The by-pass passage 57 leads from passage 50 to the uptake 58 which latter leads into the rear end of the main furnace port 59. The passage 60 leads from suitable regenerators to the slag pocket 61 and the uptake 62 leads from the slag pocket to the port 59 into which it discharges in advance of the uptake 58. The pipes 63 discharge into trench 64 located across port 59 and may be utilized to introduce fuel such as coke oven gas or natural gas. The furnace ends of the ports are water-cooled by pipe 65.

In the operation of the type of furnace shown in Figures 1 to 4, upon the incoming end, the damper 20 will be lowered to the position in which it is shown in Figure 3. The incoming air will be heated in the regenerators and that coming through passage 11 will pass directly from slag pocket 12 through uptake 13 to the rear end of the incoming port 14. The damper serves to block passage between the passage 16 and slag pocket 17 and the air coming through passage 16 will pass through opening 16' to passage 11 and will join the air coming through the latter passage. No air will come through slag pocket 17 and uptakes 18 and 18' and ports 19 and 19'. The fuel will be introduced either through nozzle 24, or through nozzles 25, or through all three nozzles as desired.

The port 14 is comparatively small and serves to properly intermix and direct the air and fuel to form an adequate mixture which will cause a short, hot flame directed upon the bath of metal in the furnace.

Upon the outgoing end, the damper 20' will be raised and the products of combustion will pass out through ports 19 and 19' as well as through port 14. A portion will pass from port 14 down uptake 13 through slag pocket 12 and passage 11 to the regenerators. The remainder of the products of combustion will pass down uptakes 18 and 18' to slag pocket 17 and passage 16 to the other regenerators. These three ports furnish adequate passage area for the larger volume of the products of combustion.

Referring next to the form of construction shown in Figures 5 to 8, upon the incoming end, the damper 45 will be lowered to the position in which it is shown in Figure 7. The incoming air will come from the regenerator through passage 30 and by-pass passage 35 to the uptake 36 and into the rear of the incoming port 37. The damper 45 serves to prevent any of the air passing from passage 30 to the slag pocket 31 and consequently none of the incoming air passes through uptakes 32 and 32' and ports 33 and 33' to the furnace chamber.

If the fuel used is producer gas or any other gas which is preheated, it will come from suitable regenerators through passage 39 to slag pocket 40 and up the uptake 41 to the port 37 which it will enter in advance of the entrance of the air. If fuel such as natural gas or coke oven gas is used, which fuels are not preheated, they will enter through pipes 42 to trench 43 across the bottom of port 37 and will there join the incoming air. The port 37 is so designed as to adequately intermix the air and gas and cause a properly directed and controlled flame.

Upon the outgoing end a portion of the products of combustion will enter the port 37 and a part of them will pass down the uptake 41 and through slag pocket 40 and passage 39 to the gas regenerators. The rest of the gases entering the port 37 will pass down uptake 36 and through the passage 35 to the passage 30 and thence to the air regenerators. The remainder of the products of combustion will pass out through the ports 33 and 33' down the uptakes 32 and 32' to slag pocket 31 and, the damper 45 being raised, will pass to passage 30 and thence to the air regenerators. The three ports thus provide an adequate area for the discharge of the products of combustion.

The form of construction shown in Figures 9 and 10 is in many ways similar to that just described. The incoming air comes from suitable regenerators to passage 50 and, the damper 55 being lowered, passes through by-pass passage 57 through uptake 58 and enters the rear end of the main port 59. If preheated gas is used, it comes through suitable regenerators to passage 60, thence to slag pocket 61 and uptake 62 to the port 59 which it enters in advance of the entrance of the air. If a non-preheated fuel is used, it is introduced through pipe 63 and trench 64 in the bottom of the forward portion of the port 59. The port 59 is designed with reference to the proper introduction and control of the air and fuel.

Upon the outgoing end, the products of combustion pass in part into the port 59 and a portion of these gases will pass down uptake 62 through slag pocket 61 and passage 60 to the gas regenerators. The rest of this part of the gases will pass down uptake 58 and through passage 57 to passage 50 and thence to the air regenerators. The remainder of the products of combustion will pass through the lateral ports 53 and 53' and uptakes 52 and 52' to the slag pocket 51. The damper 55 will be opened and these gases will pass through passage 50 to the air regenerator. This construction therefore provides on the outgoing end adequate discharge area for the large volume of the products of combustion.

In all of the constructions shown, the control is effected by a single damper which is located between the slag pocket and the passages. This form of construction is considerably more economical in many ways than the form heretofore used of placing horizontal dampers across certain of the uptakes.

While I have illustrated several embodiments of my invention, it will be apparent that it may be constructed in various other ways and it is my intention to cover all such modifications as come within the scope of the appended claims.

I claim:

1. In an open hearth furnace, regenerative chambers, slag pockets, passages connecting the regenerative chambers and slag pockets, passages connecting the slag pockets and furnace ports, and vertically operating dampers adapted to close off the passages connecting certain of the regenerators and the slag pockets, and passages for connecting said certain regenerators to certain of the furnace ports independently of the slag pockets.

2. In an open hearth furnace, regenerative chambers, slag pockets, passages connecting the regenerative chambers and slag pockets, passages connecting the slag pockets and furnace ports, means adapted to close off the passages connecting certain of the regenerators and the slag pockets, and additional passages connecting said certain regenerative chambers and certain of the furnace ports other than those connected to the slag pockets.

3. In an open hearth furnace, a plurality of regenerative chambers at each end of the furnace, a separate slag pocket connected by passages to each regenerator, and additional passages connecting certain of the regenerators with furnace ports independently of said slag pockets.

Signed at Chicago, Illinois, this 10th day of July, 1922.

GEORGE L. DANFORTH, Jr.